US006897876B2

(12) United States Patent
Murdoch et al.

(10) Patent No.: US 6,897,876 B2
(45) Date of Patent: May 24, 2005

(54) METHOD FOR TRANSFORMING THREE COLOR INPUT SIGNALS TO FOUR OR MORE OUTPUT SIGNALS FOR A COLOR DISPLAY

(75) Inventors: Michael J. Murdoch, Rochester, NY (US); Michael E. Miller, Rochester, NY (US); Ronald S. Cok, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 88 days.

(21) Appl. No.: 10/607,374

(22) Filed: Jun. 26, 2003

(65) Prior Publication Data

US 2004/0263528 A1 Dec. 30, 2004

(51) Int. Cl.[7] ............................ H04N 9/67; G09G 1/28; G09G 3/14; G09G 5/02; G06K 9/00

(52) U.S. Cl. ........................ 345/589; 345/593; 345/597; 345/22; 345/39; 345/46; 345/84; 382/162; 382/167; 348/161; 358/518

(58) Field of Search ................................ 345/589–593, 345/597, 600, 606, 610, 204–205, 690, 22, 39, 46, 48, 72, 83–84; 348/659–661, 708; 382/162–167; 358/515–518

(56) References Cited

U.S. PATENT DOCUMENTS 4,800,375 A 1/1989 Silverstein et al.
5,233,385 A 8/1993 Sampsell
5,341,153 A 8/1994 Benzschawel et al.
5,563,621 A 10/1996 Silsby
5,638,084 A 6/1997 Kalt
5,929,843 A 7/1999 Tanioka
6,388,644 B1 5/2002 DeZwart et al.
6,453,067 B1 * 9/2002 Morgan et al. ............. 382/162
6,486,923 B1 * 11/2002 Maeshima et al. .......... 348/649
2002/0024618 A1 2/2002 Imai
2002/0122160 A1 9/2002 Kunzman
2002/0186214 A1 12/2002 Siwinski
2003/0034992 A1 2/2003 Brown et al.
2004/0178743 A1 * 9/2004 Miller et al. ............. 315/169.3

FOREIGN PATENT DOCUMENTS

EP 1 098 537 5/2001

OTHER PUBLICATIONS

Klompenhouwer et al., Subpixel Image Scaling for Color Matrix Displays, *SID 02 Digest,* pp. 176–179.

Lee et al., TFT–LCD with TGBW Color System, *SID 03 Digest,* pp. 1212–1215.

* cited by examiner

*Primary Examiner*—Matthew C. Bella
*Assistant Examiner*—Wesner Sajous
(74) *Attorney, Agent, or Firm*—Thomas H. Close

(57) ABSTRACT

A method for transforming three color input signals (R, G, B) corresponding to three gamut defining color primaries to four color output signals (R', G', B', W) corresponding to the gamut defining color primaries and one additional color primary W for driving a display having a white point different from W includes the steps of: normalizing the color input signals (R,G,B) such that a combination of equal amounts in each signal produces a color having XYZ tristimulus values identical to those of the additional color primary to produce normalized color signals (Rn,Gn,Bn); calculating a common signal S that is a function F1 of the three normalized color signals (Rn,Gn,Bn); calculating a function F2 of the common signal S and adding it to each of the three normalized color signals (Rn,Gn,Bn) to provide three color signals (Rn',Gn',Bn'); normalizing the three color signals (Rn',Gn',Bn') such that a combination of equal amounts in each signal produces a color having XYZ tristimulus values identical to those of the display white point to produce three of the four color output signals (R',G',B'); and calculating a function F3 of the common signal S and assigning it to the fourth color output signal W.

37 Claims, 9 Drawing Sheets

METHOD FOR TRANSFORMING THREE COLOR INPUT SIGNALS TO FOUR OR MORE OUTPUT SIGNALS FOR A COLOR DISPLAY

FIELD OF THE INVENTION

The present invention relates to color processing three color image signals for display on a color OLED display having four or more color primaries.

BACKGROUND OF THE INVENTION

Additive color digital image display devices are well known and are based upon a variety of technologies such as cathode ray tubes, liquid crystal modulators, and solid-state light emitters such as Organic Light Emitting Diodes (OLEDs). In a common OLED color display device a pixel includes red, green, and blue colored OLEDs. These light emitting color primaries define a color gamut, and by additively combining the illumination from each of these three OLEDs, i.e. with the integrative capabilities of the human visual system, a wide variety of colors can be achieved. OLEDs may be used to generate color directly using organic materials that are doped to emit energy in desired portions of the electromagnetic spectrum, or alternatively, broadband emitting (apparently white) OLEDs may be attenuated with color filters to achieve red, green and blue.

It is possible to employ a white, or nearly white OLED along with the red, green, and blue OLEDs to improve power efficiency and/or luminance stability over time. Other possibilities for improving power efficiency and/or luminance stability over time include the use of one or more additional non-white OLEDs. However, images and other data destined for display on a color display device are typically stored and/or transmitted in three channels, that is, having three signals corresponding to a standard (e.g. sRGB) or specific (e.g. measured CRT phosphors) set of primaries. It is also important to recognize that this data is typically sampled to assume a particular spatial arrangement of light emitting elements. In an OLED display device these light emitting elements are typically arranged side by side on a plane. Therefore if incoming image data is sampled for display on a three color display device, the data will also have to be resampled for display on a display having four OLEDs per pixel rather than the three OLEDs used in a three channel display device.

In the field of CMYK printing, conversions known as undercolor removal or gray component replacement are made from RGB to CMYK, or more specifically from CMY to CMYK. At their most basic, these conversions subtract some fraction of the CMY values and add that amount to the K value. These methods are complicated by image structure limitations because they typically involve non-continuous tone systems, but because the white of a subtractive CMYK image is determined by the substrate on which it is printed, these methods remain relatively simple with respect to color processing. Attempting to apply analogous algorithms in continuous tone additive color systems would cause color errors if the additional primary is different in color from the display system white point. Additionally, the colors used in these systems can typically be overlaid on top of one another and so there is also no need to spatially resample the data when displaying four colors.

In the field of sequential-field color projection systems, it known to use a white primary in combination with red, green, and blue primaries. White is projected to augment the brightness provided by the red, green, and blue primaries, inherently reducing the color saturation of some, if not all, of the colors being projected. A method proposed by Morgan et al. in U.S. Pat. No. 6,453,067 issued Sep. 17, 2002, teaches an approach to calculating the intensity of the white primary dependent on the minimum of the red, green, and blue intensities, and subsequently calculating modified red, green, and blue intensities via scaling. The scaling is ostensibly to try to correct the color errors resulting from the brightness addition provided by the white, but simple correction by scaling will never restore, for all colors, all of the color saturation lost in the addition of white. The lack of a subtraction step in this method ensures color errors in at least some colors. Additionally, Morgan's disclosure describes a problem that arises if the white primary is different in color from the desired white point of a display device without adequately solving it. The method simply accepts an average effective white point, which effectively limits the choice of white primary color to a narrow range around the white point of the device. Since the red, green, blue, and white elements are projected to spatially overlap one another, there is no need to spatially resample the data for display on the four color device.

A similar approach is described by Lee et al. (SID 2003 reference) to drive a color liquid crystal display having red, green, blue, and white pixels. Lee et al. calculate the white signal as the minimum of the red, green, and blue signals, then scale the red, green, and blue signals to correct some, but not all, color errors, with the goal of luminance enhancement paramount. The method of Lee et al. suffers from the same color inaccuracy as that of Morgan and no reference is made to spatially resampling of the incoming three color data to the array of red, green, blue and white elements.

In the field of ferroelectric liquid crystal displays, another method is presented by Tanioka in U.S. Pat. No. 5,929,843, issued Jul. 27, 1999. Tanioka's method follows an algorithm analogous to the familiar CMYK approach, assigning the minimum of the R,G, and B signals to the W signal and subtracting the same from each of the R, G, and B signals. To avoid spatial artifacts, the method teaches a variable scale factor applied to the minimum signal that results in smoother colors at low luminance levels. Because of its similarity to the CMYK algorithm, it suffers from the same problem cited above, namely that a white pixel having a color different from that of the display white point will cause color errors. Similarly to Morgan et al. (U.S. Pat. No. 6,453,067, referenced above), the color elements are typically projected to spatially overlap one another and so there is no need for spatial resampling of the data.

It should be noted, that the physics of light generation and modulation of OLED display devices differ significantly from the physics of devices used in printing, display devices typically used in field sequential color projection, and liquid crystal displays. These differences impose different constraints upon the method for transforming three color input signals. Among these differences is the ability of the OLED display device to turn off the illumination source on an OLED by OLED basis. This differs from devices typically used in field sequential display devices and liquid crystal displays since these devices typically modulate the light that is emitted from a large area light source that is maintained at a constant level. Further, it is well known in the field of OLED display devices that high drive current densities result in shorter OLED lifetimes. This same effect is not characteristic of devices applied in the before-mentioned fields.

While stacked OLED display devices have been discussed in the prior art, providing full color data at each visible spatial location, OLED display devices are commonly constructed from multiple colors of OLEDs that are arranged on a single plane. When displays provide color light emitting elements that have different spatial location, it is known to sample the data for the spatial arrangement. For example, U.S. Pat. No. 5,341,153 issued Aug. 23, 1994 to Benzschawel et al., discusses a method for displaying a high resolution color image on a lower resolution liquid crystal display in which the light emitting elements of different colors have different spatial locations. Using this method, the spatial location and the area of the original image that is sampled to produce a signal for each light emitting element is considered when sampling the data to a format that provides sub-pixel rendering. While this patent does mention providing sampling of the data for a display device having four different color light emitting elements, it does not provide a method for converting from a traditional three color image signal to an image signal that is appropriate for display on a display device having four different color light emitting elements. Additionally, Benzschawel et al. assumes that the input data originates from an image file that is higher in resolution than the display and contains information for all color light emitting elements at every pixel location.

The prior art also includes methods for resampling image data from one intended spatial arrangement of light emitting elements to a second spatial arrangement of light emitting elements. US Patent Application No. 2003/0034992A1, by Brown Elliott et al., published Feb. 20, 2003, discusses a method of resampling data that was intended for presentation on a display device having one spatial arrangement of light emitting elements having three colors to a display device having a different spatial arrangement of three color light emitting elements. Specifically, this patent application discusses resampling three color data that was intended for presentation on a display device with a traditional arrangement of light emitting elements to three color data that is intended for presentation on a display device with an alternate arrangement of light emitting elements. However, this application does not discuss the conversion of data for presentation on a four or more color device.

There is a need, therefore, for an improved method for transforming three color input signals, bearing images or other data, to four or more output signals.

SUMMARY OF THE INVENTION

The need is met according to the present invention by providing a method for transforming three color input signals (R, G, B) corresponding to three gamut-defining color primaries to four color output signals (R', G', B', W) corresponding to the gamut-defining color primaries and one additional color primary W for driving a display having a white point different from W that includes the steps of: normalizing the color input signals (R,G,B) such that a combination of equal amounts in each signal produces a color having XYZ tristimulus values identical to those of the additional color primary to produce normalized color signals (Rn,Gn,Bn); calculating a common signal S that is a function F1 of the three normalized color signals (Rn,Gn,Bn); calculating a function F2 of the common signal S and adding it to each of the three normalized color signals (Rn,Gn,Bn) to provide three color signals (Rn',Gn',Bn'); normalizing the three color signals (Rn',Gn',Bn') such that a combination of equal amounts in each signal produces a color having XYZ tristimulus values identical to those of the display white point to produce three of the four color output signals (R',G',B'); and calculating a function F3 of the common signal S and assigning it to the fourth color output signal W.

Advantages

The present invention has the advantage of providing a transformation that preserves color accuracy in the display system when the additional OLED is not at the white point of the display. Additionally, according to one aspect of the invention, the transformation allows optimization of the mapping to preserve the lifetime of the OLED display device. The transformation also may provide a method of spatially reformatting the data to a desired spatial arrangement of OLEDs.

DETAILED DESCRIPTION OF THE INVENTION

The present invention is directed to a method for transforming three color input signals, bearing images or other data, to four or more color output signals for display on an additive display device having four or more color primaries. The present invention is useful, for example, for converting a standard 3-color RGB input color image signal to a four color signal for driving a four-color OLED display device having pixels made up of light emitting elements that each emit light of one of the four colors.

Figure 1:
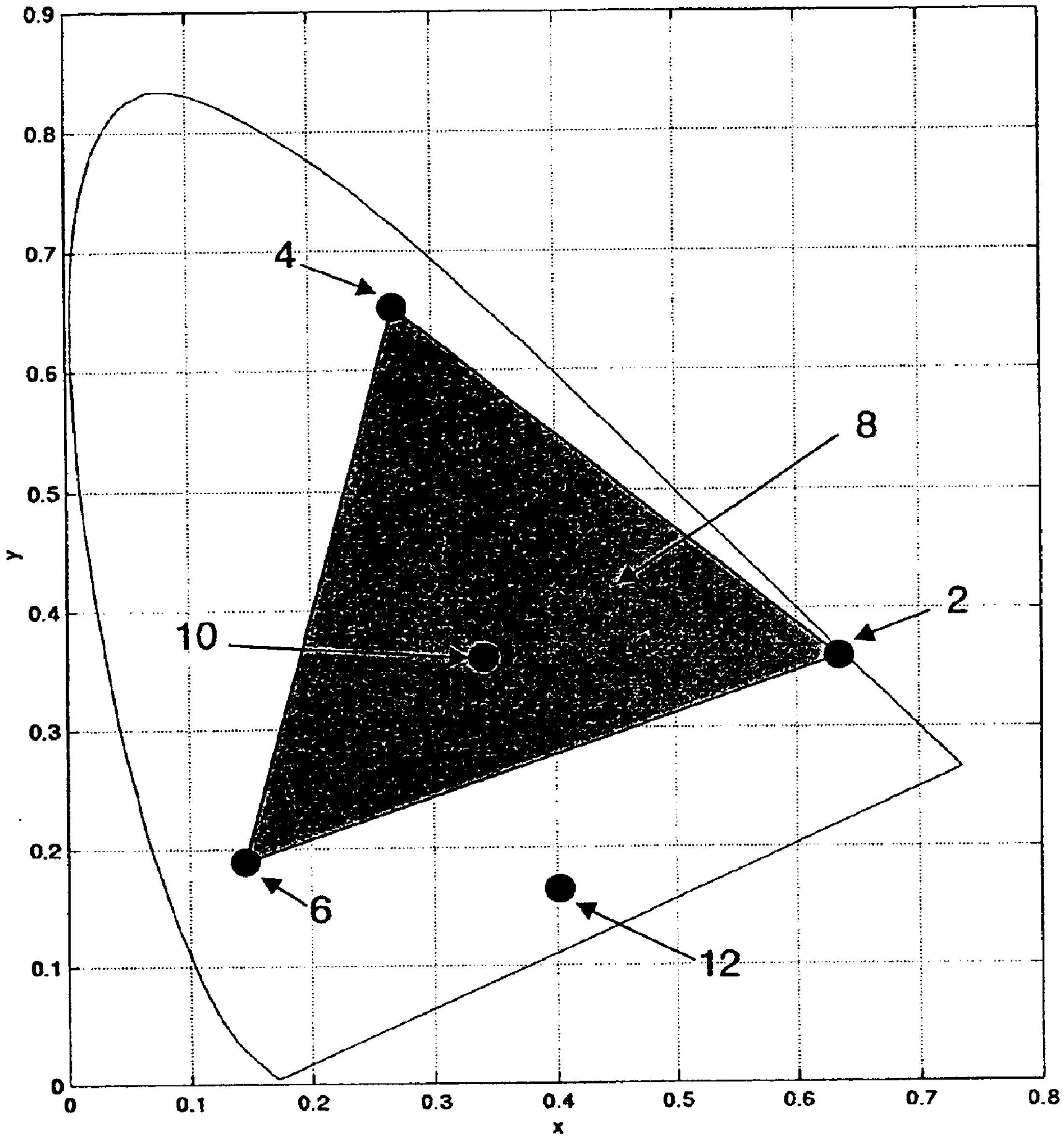
FIG. 1 (PRIOR ART)
FIG. 1 is a prior art CIE 1931 Chromaticity Diagram useful in describing in-gamut and out-of-gamut colors.

FIG. 1 shows a 1931 CIE chromaticity diagram displaying hypothetical representations of the primaries of the four-color OLED display device. The red primary 2, green primary 4, and blue primary 6 define a color gamut, bounded by the triangle 8. The additional primary 10 is substantially white, because it is near the center of the diagram in this example, but it is not necessarily at the white point of the display. An alternative additional primary 12 is shown, outside the gamut 8, the use of which will be described later.

A given display device has a white point, generally adjustable by hardware or software via methods known in the art, but fixed for the purposes of this example. The white point is the color resulting from the combination of three color primaries, in this example the red, green, and blue primaries, being driven to their highest addressable extent. The white point is defined by its chromaticity coordinates and its luminance, commonly referred to as xyY values, which may be converted to CIE XYZ tristimulus values by the following equations:

$$X = \frac{x}{y} \cdot Y$$

$$Y = Y$$

$$Z = \frac{(1 - x - y)}{y} \cdot Y$$

Noting that all three tristimulus values are scaled by luminance Y, it is apparent that the XYZ tristimulus values, in the strictest sense, have units of luminance, such as cd/m$^2$. However, white point luminance is often normalized to a dimensionless quantity with a value of 100, making it effectively percent luminance. Herein, the term "luminance" will always be used to refer to percent luminance, and XYZ tristimulus values will be used in the same sense. Thus, a common display white point of D65 with xy chromaticity values of (0.3127, 0.3290) has XYZ tristimulus values of (95.0, 100.0, 108.9).

The display white point and the chromaticity coordinates of three display primaries, in this example the red, green, and blue primaries, together specify a phosphor matrix, the calculation of which is well known in the art. Also well known is that the colloquial term "phosphor matrix," though historically pertinent to CRT displays using light-emitting phosphors, may be used more generally in mathematical descriptions of displays with or without physical phosphor materials. The phosphor matrix converts intensities to XYZ tristimulus values, effectively modeling the additive color system that is the display, and in its inversion, converts XYZ tristimulus values to intensities.

The intensity of a primary is herein defined as a value proportional to the luminance of that primary and scaled such that the combination of unit intensity of each of the three primaries produces a color stimulus having XYZ tristimulus values equal to those of the display white point. This definition also constrains the scaling of the terms of the phosphor matrix. The OLED display example, with red, green, and blue primary chromaticity coordinates of (0.637, 0.3592), (0.2690, 0.6508), and (0.1441, 0.1885), respectively, with the D65 white point, has a phosphor matrix M3:

$$M3 = \begin{bmatrix} 56.7 & 16.0 & 22.4 \\ 32.1 & 38.7 & 29.2 \\ 0.545 & 4.76 & 104 \end{bmatrix}$$

The phosphor matrix M3 times intensities as a column vector produces XYZ tristimulus values, as in this equation:

$$M3 \times \begin{bmatrix} I_1 \\ I_2 \\ I_3 \end{bmatrix} = \begin{bmatrix} X \\ Y \\ Z \end{bmatrix}$$

where I1 is the intensity of the red primary, I2 is the intensity of the green primary, and I3 is the intensity of the blue primary.

It is to be noted that phosphor matrices are typically linear matrix transformations, but the concept of a phosphor matrix transform may be generalized to any transform or series of transforms that leads from intensities to XYZ tristimulus values, or vice-versa.

The phosphor matrix may also be generalized to handle more than three primaries. The current example contains an additional primary with xy chromaticity coordinates (0.3405, 0.3530)—close to white, but not at the D65 white point. At a luminance arbitrarily chosen to be 100, the additional primary has XYZ tristimulus values of (96.5, 1000.0, 86.8). These three values may be appended to phosphor matrix M3 without modification to create a fourth column, although for convenience, the XYZ tristimulus values are scaled to the maximum values possible within the gamut defined by the red, green, and blue primaries. The phosphor matrix M4 is as follows:

$$M4 = \begin{bmatrix} 56.7 & 16.0 & 22.4 & 88.1 \\ 32.1 & 38.7 & 29.2 & 91.3 \\ 0.545 & 4.76 & 104 & 79.3 \end{bmatrix}$$

An equation similar to that presented earlier will allow conversion of a four-value vector of intensities, corresponding to the red, green, blue, and additional primaries, to the XYZ tristimulus values their combination would have in the display device:

$$M4 \times \begin{bmatrix} I_1 \\ I_2 \\ I_3 \\ I_4 \end{bmatrix} = \begin{bmatrix} X \\ Y \\ Z \end{bmatrix}$$

In general, the value of a phosphor matrix lies in its inversion, which allows for the specification of a color in XYZ tristimulus values and results in the intensities required to produce that color on the display device. Of course, the color gamut limits the range of colors whose reproduction is possible, and out-of-gamut XYZ tristimulus specifications result in intensities outside the range [0,1]. Known gamut-mapping techniques may be applied to avoid this situation, but their use is tangential to the present invention and will not be discussed. The inversion is simple in the case of 3×3 phosphor matrix M3, but in the case of 3×4 phosphor matrix M4 it is not uniquely defined. The present invention provides a method for assigning intensity values for all four primary channels without requiring the inversion of the 3×4 phosphor matrix.

The method of the present invention begins with color signals for the three gamut-defining primaries, in this example, intensities of the red, green, and blue primaries. These are reached either from a XYZ tristimulus value specification by the above described inversion of phosphor matrix M3 or by known methods of converting RGB, YCC, or other three-channel color signals, linearly or nonlinearly encoded, to intensities corresponding to the gamut-defining primaries and the display white point.

Figure 2:
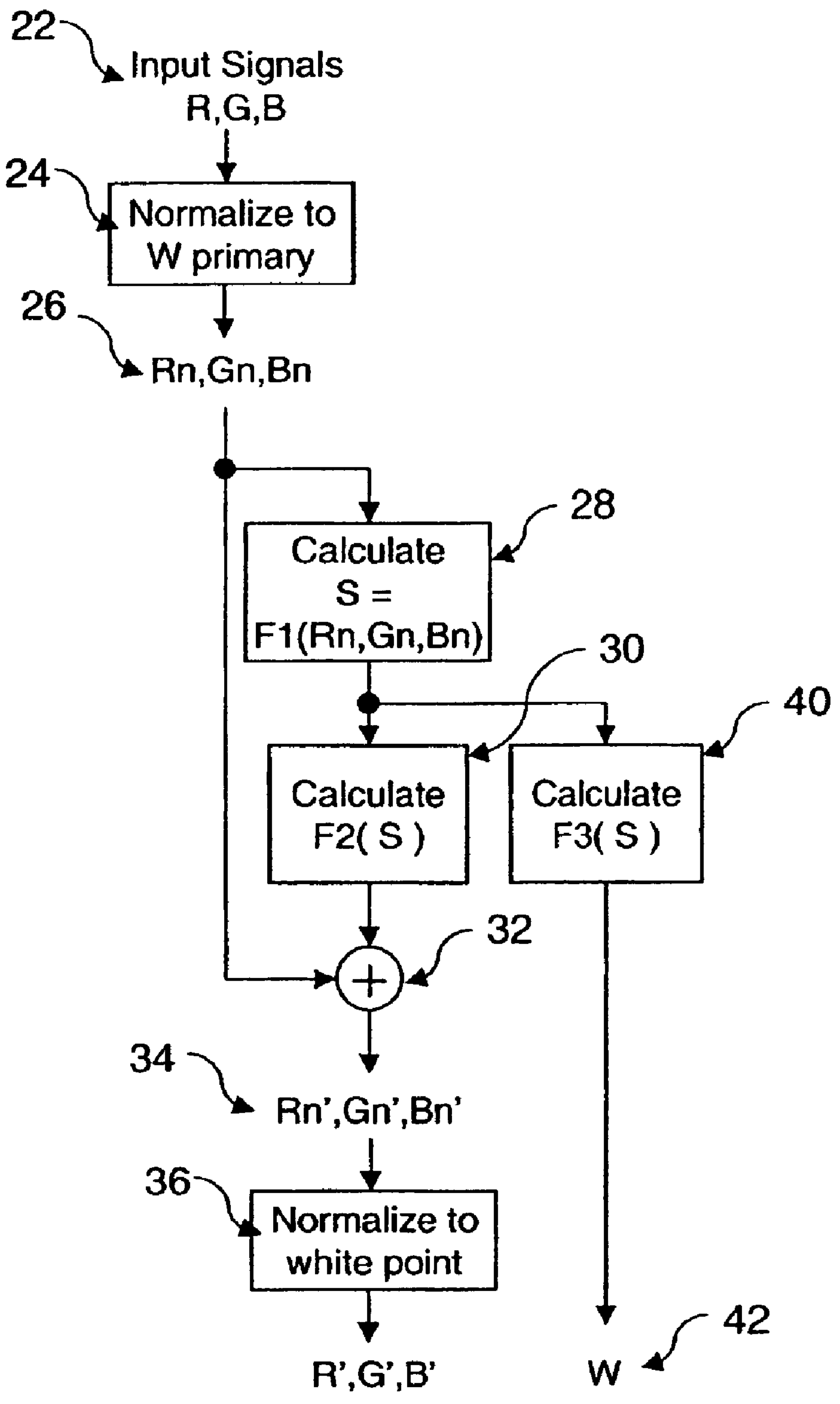
FIG. 2 is a flow diagram illustrating the method of the present invention.

FIG. 2 shows a flow diagram of the general steps in the method of the present invention. The three color input signals (R,G,B) 22 are first normalized 24 with respect to the additional primary W. Following the OLED example, the red, green, and blue intensities are normalized such that the combination of unit intensity of each produces a color stimulus having XYZ tristimulus values equal to those of the additional primary W. This is accomplished by scaling the red, green, and blue intensities, shown as a column vector, by the inverse of the intensities required to reproduce the color of the additional primary using the gamut-defining primaries:

$$\begin{bmatrix} 1.010 & 0 & 0 \\ 0 & 1.000 & 0 \\ 0 & 0 & 1.400 \end{bmatrix} \times \begin{bmatrix} R \\ G \\ B \end{bmatrix} = \begin{bmatrix} Rn \\ Gn \\ Bn \end{bmatrix}$$

The normalized signals (Rn,Gn,Bn) 26 are used to calculate 28 a common signal S that is a function F1 (Rn, Cn, Bn). In the present example, the function F1 is a special minimum function which chooses the smallest non-negative signal of the three. The common signal S is used to calculate 30 the value of function F2(S). In this example, function F2 provides arithmetic inversion:

$$F2(S) = -S$$

The output of function F2 is added 32 to the normalized color signals (Rn,Gn,Bn), resulting in normalized output signals (Rn',Gn',Bn') 34 corresponding to the original primary channels. These signals are normalized 36 to the display white point by scaling by the intensities required to reproduce the color of the additional primary using the gamut-defining primaries, resulting in the output signals (R',G',B') which correspond to the input color channels:

$$\begin{bmatrix} 0.990 & 0 & 0 \\ 0 & 1.000 & 0 \\ 0 & 0 & 0.715 \end{bmatrix} \times \begin{bmatrix} Rn' \\ Gn' \\ Bn' \end{bmatrix} = \begin{bmatrix} R' \\ G' \\ B' \end{bmatrix}$$

The common signal S is used to calculate 40 the value of function F3 (S). In the simple four color OLED example, function F3 is simply the identity function. The output of function F3 is assigned to the output signal W 42, which is the color signal for the additional primary W. The four color output signals in this example are intensities and may be combined into a four-value vector (R',G',B',W), or in general (I1',I2',I3',I4'). The 3×4 phosphor matrix M4 times this vector shows the XYZ tristimulus values that will be produced by the display device:

$$M4 \times \begin{bmatrix} I_1' \\ I_2' \\ I_3' \\ I_4' \end{bmatrix} = \begin{bmatrix} X \\ Y \\ Z \end{bmatrix}$$

When, as in this example, function F1 chooses the minimum non-negative signal, the choice of functions F2 and F3 determine how accurate the color reproduction will be for in-gamut colors. If F2 and F3 are both linear functions, F2 having negative slope and F3 having positive slope, the effect is the subtraction of intensity from the red, green, and blue primaries and the addition of intensity to the additional primary. Further, when linear functions F2 and F3 have slopes equal in magnitude but opposite in sign, the intensity subtracted from the red, green, and blue primaries is completely accounted for by the intensity assigned to the additional primary, preserving accurate color reproduction and providing luminance identical to the three color system.

If instead the slope of F3 is greater in magnitude than the slope of F2, system luminance will be augmented and color accuracy will degrade, decreasing saturation. If instead the slope of F3 is lesser in magnitude than the slope of F2, system luminance will be diminished and color accuracy will degrade, increasing saturation. If functions F2 and F3 are non-linear functions, color accuracy may still be preserved, providing F2 is decreasing and F2 and F3 are symmetric about the independent axis.

In any of these situations, functions F2 and F3 may be designed to vary according to the color represented by the color input signals. For example, they may become steeper as the luminance increases or the color saturation decreases, or they may change with respect to the hue of the color input signal (R,G,B). There are many combinations of functions F2 and F3 that will provide color accuracy with different levels of utilization of the additional primary with respect to the gamut-defining primaries. Additionally, combinations of functions F2 and F3 exist that allow a trade of color accuracy in favor of luminance. Choice of these functions in the design or use of a display device will depend on its intended use and specifications. For example, a portable OLED display device benefits greatly in terms of power efficiency, and thus battery life, with maximum utilization of an additional primary having a higher power efficiency than one or more of the gamut defining primaries. Use of such a display with a digital camera or other imaging device demands color accuracy as well, and the method of the present invention provides both.

The normalization steps provided by the present invention allow for accurate reproduction of colors within the gamut of the display device regardless of the color of the additional primary. In the unique case where the color of the additional primary is exactly the same as the display white point, these normalization steps reduce to identity functions, and the method produces the same result as simple white replacement. In any other case, the amount of color error introduced by ignoring the normalization steps depends largely on the difference in color between the additional primary and the display white point.

Normalization is especially useful in the transformation of color signals for display in a display device having an additional primary outside the gamut defined by the gamut-defining primaries. Returning to FIG. 1, the additional primary 12 is shown outside the gamut 8. Because it is out of gamut, reproduction of its color using the red, green, and blue primaries would require intensities that exceed the range [0,1]. While physically unrealizable, these values may be used in calculation. With additional primary chromaticity coordinates (0.4050, 0.1600), the intensity required of the green primary is negative, but the same relationship shown earlier can be used to normalize the intensities:

$$\begin{bmatrix} 1.000 & 0 & 0 \\ 0 & -1.411 & 0 \\ 0 & 0 & 1.543 \end{bmatrix} \times \begin{bmatrix} R \\ G \\ B \end{bmatrix} = \begin{bmatrix} Rn \\ Gn \\ Bn \end{bmatrix}$$

A color outside the gamut of the red, green, and blue primaries, specifically between the red-blue gamut boundary and the additional primary, will call for negative intensity for the green primary and positive intensities for the red and blue primaries. After this normalization, the red and blue values are negative, and the green value is positive. The function F1 selects the green as the minimum non-negative value and the green is replaced in part or in total by intensity from the additional primary. The negatives are removed after the additional primary intensity is calculated by undoing the normalization:

$$\begin{bmatrix} 1.000 & 0 & 0 \\ 0 & -0.709 & 0 \\ 0 & 0 & 0.648 \end{bmatrix} \times \begin{bmatrix} Rn' \\ Gn' \\ Bn' \end{bmatrix} = \begin{bmatrix} R' \\ G' \\ B' \end{bmatrix}$$

The normalization steps preserve color accuracy, clearly allowing white, near-white, or any other color to be used as an additional primary in an additive color display. In OLED displays, the use of a white emitter near but not at the display white point is very feasible, as is the use of a second blue, a second green, a second red, or even a gamut-expanding emitter such as yellow or purple.

Savings in cost or in processing time may be realized by using signals that are approximations of intensity in the calculations. It is well known that image signals are often encoded non-linearly, either to maximize the use of bit-depth or to account for the characteristic curve (e.g. gamma) of the display device for which they are intended. Intensity was previously defined as normalized to unity at the device white point, but it is clear, given linear functions in the method, that scaling intensity to code value 255, peak voltage, peak current, or any other quantity linearly related to the luminance output of each primary is possible and will not result in color errors.

Figure 3:
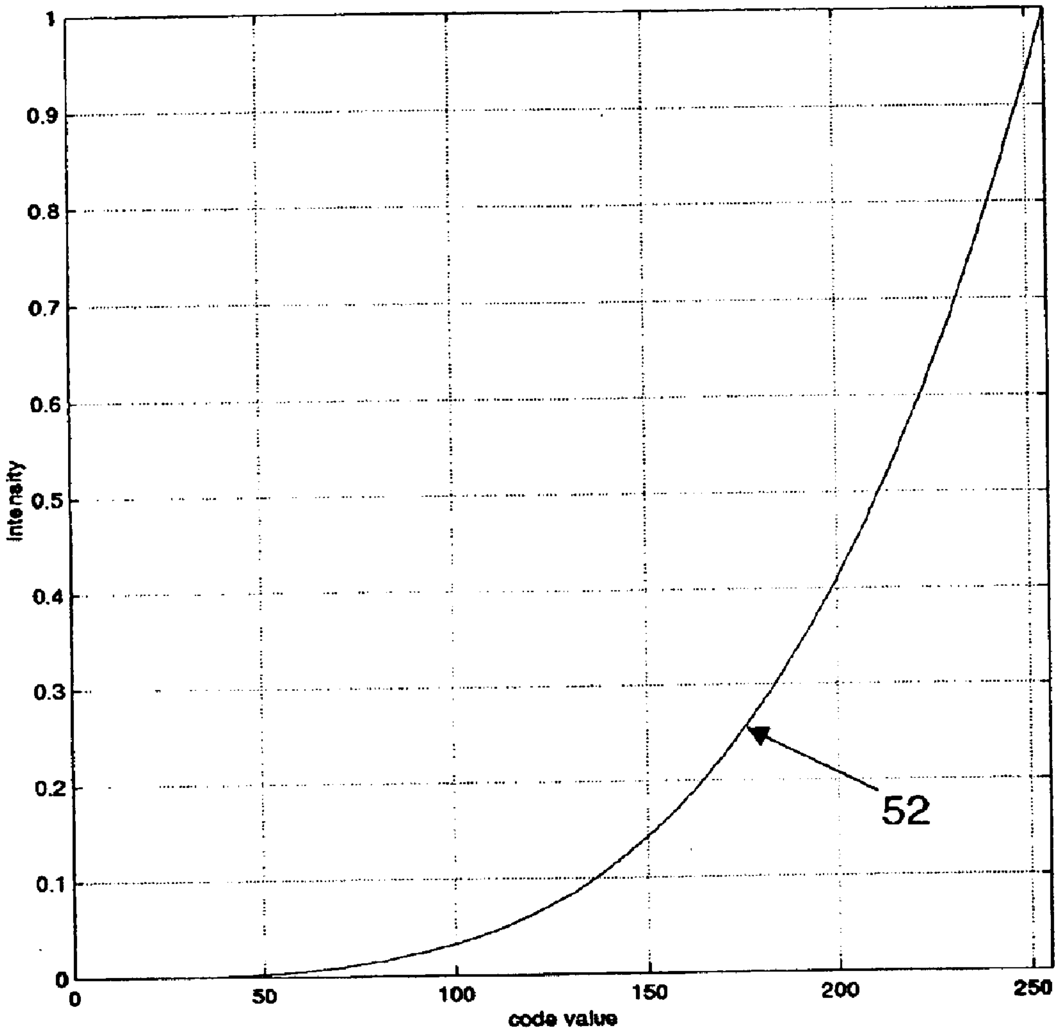
Fig. 3 (Prior Art)
FIG. 3 is a graph showing the characteristic curve of a prior art OLED device.

Approximating intensity by using a non-linearly related quantity, such as gamma-corrected code value, will result in color errors. However, depending on the deviation from linearity and which portion of the relationship is used, the errors might be acceptably small when considering the time or cost savings. For example, FIG. 3 shows the characteristic curve for an OLED, illustrating its non-linear intensity response to code value. The curve has a knee 52 above which it is much more linear in appearance than below. Using code value to approximate intensity is probably a bad choice, but subtracting a constant (approximately 175 for the example shown in FIG. 3) to use the knee 52 shown, from the code value makes a much better approximation. The signals (R,G,B) provided to the method shown in FIG. 2 are calculated as follows:

$$\begin{bmatrix} Rcv \\ Gcv \\ Bcv \end{bmatrix} - 175 = \begin{bmatrix} R \\ G \\ B \end{bmatrix}$$

The shift is removed after the method shown in FIG. 2 is completed by using the following step:

$$\begin{bmatrix} R' \\ G' \\ B' \end{bmatrix} + 175 = \begin{bmatrix} Rcv' \\ Gcv' \\ Bcv' \end{bmatrix}$$

This approximation may save processing time or hardware cost, because it replaces a lookup operation with simple addition.

Utilizing the present invention to transform three color input signals to more than four color output signals requires successive application of the method shown in FIG. 2. Each successive application of the method calculates the signal for one of the additional primaries, and the order of calculation is determined by the inverse of a priority specified for the primary. For example, consider an OLED display device having the red, green, and blue primaries already discussed, having chromaticities (0.637, 0.3592), (0.2690, 0.6508), and (0.1441, 0.1885) respectively, plus two additional primaries, one slightly yellow having chromaticities (0.3405, 0.3530) and the other slightly blue having chromaticities (0.2980, 0.3105). The additional primaries will be referred to as yellow and light blue, respectively.

Prioritizing the additional primaries may take into account luminance stability over time, power efficiency, or other characteristics of the emitter. In this case, the yellow primary is more power efficient than the light blue primary, so the order of calculation proceeds with light blue first, then yellow. Once intensities for red, green, blue, and light blue have been calculated, one must be set aside to allow the method to transform the remaining three signals to four. The choice of the value to set aside may be arbitrary, but is best chosen to be the signal which was the source of the minimum calculated by function F1. If that signal was the green intensity, the method calculates the yellow intensity based on the red, blue, and light blue intensities. All five are brought together at the end: red, green, blue, light blue, and yellow intensities for display. A 3×5 phosphor matrix may be created to model their combination in the display device. This technique may easily be expanded to calculate signals for any number of additional primaries starting from three input color signals.

The method described in FIG. 2 may be further modified to optimize the RGB to R'G'B'W conversion to better match the physical constraints of an OLED display device. Mathematical simulations performed by the authors to model the lifetime of an OLED display indicate that when the chromaticity coordinates of the white OLED is close to the chromaticity coordinates of the display white point, the lifetime of a white OLED that is the same size as the RGB OLEDs can be significantly shorter than the lifetime of the RGB OLEDs. For example, in a typical display designed for use on the back of a digital camera, the projected lifetime of the red, green, and blue OLEDs is more than twice as long as the projected lifetime of the white OLED under certain conditions. Since the lifetime of the display device is limited by the OLED with the shortest lifetime, it is important to provide a better balance between the lifetime of the four OLEDs that are used to generate the four primaries.

Figure 4:
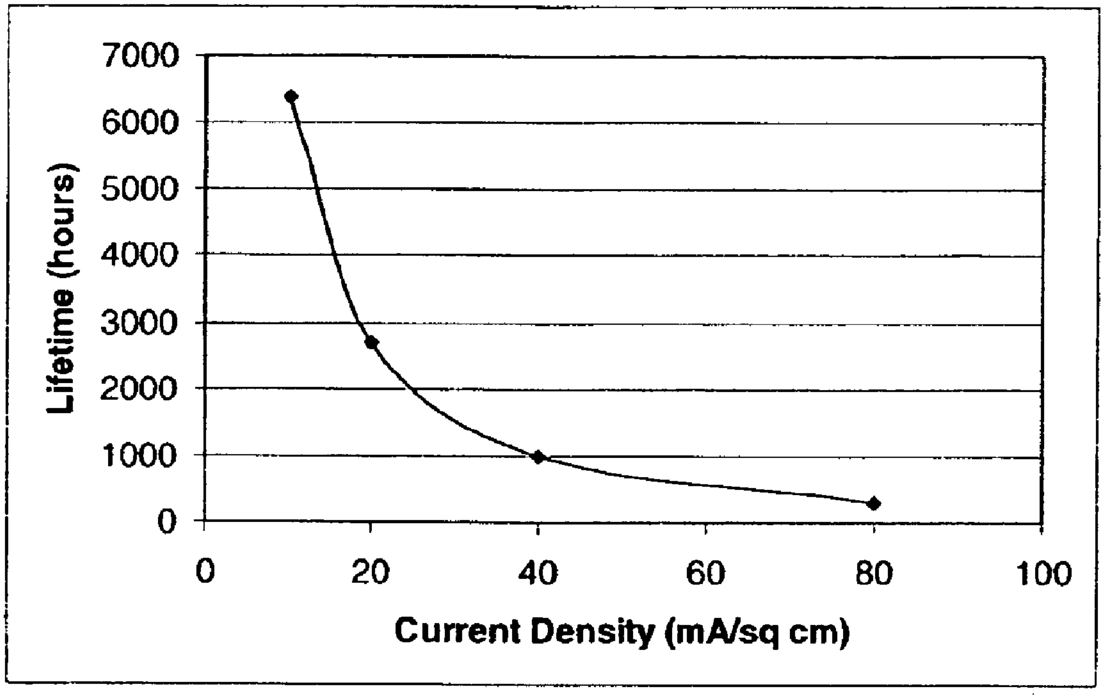
FIG. 4 (PRIOR ART)
FIG. 4 graph showing a plot of OLED lifetime as a function of the current density used to drive the OLED.

It is well known in the art that the lifetime of an OLED is highly dependent on the current density used to drive the OLED, with higher current densities resulting in significantly shorter lifetimes. FIG. 4 shows a curve of OLED lifetime as a function of current density. It is further known that the current density in a display is proportional to the current used to drive the OLED and the current is proportional to the luminance that is produced. Therefore, by avoiding using any of high intensities for any OLED, one can increase the lifetime of the OLED.

The algorithm shown in FIG. 2, generally reduces the intensities of the R,G,B and increases the intensity of the W channel. This fact increases the lifetime of the red, green, and blue OLEDs but produces high intensities for the white OLED when the chromaticity coordinate of the white you are trying to generate is near the chromaticity coordinate of the white OLED. To avoid the use of high intensity for W, F2 and F3 may be defined to be nonlinear functions such that when the value of S is higher, F2 and F3 produce smaller absolute values than when S is lower. These functions may be described either mathematically or through a lookup table. A preferred lookup table would provide values of −S for F2 and S for F3 but a fraction of −S and S, respectively, when the value of S was higher than some threshold. By selecting the fraction and the cutoff value for S appropriately, a maximum intensity for W can be selected without loss of color accuracy. The maximum value for the intensity of W can then be chosen such that the lifetime of the white OLED is equivalent to the lifetime of the red, green, and blue OLEDs for the intended application.

It may also be noted that when the chromaticity coordinates of the white OLED are near the chromaticity coordinate of the display white point, the normalization steps 24 and 36 of the RGB signals may also not be required. Alternatively, one may normalize 24 the RGB intensities to the white primary but not normalize 36 these values to the white point of the display.

The method of the present invention can be implemented in the context of an image processing method that allows the incoming data to be spatially resampled to the RGBW pattern of OLEDs on the OLED display device. In such a method, the three-color input signal is typically converted to a four (or more) color signal using a method such as the methods described above. A resampling is then performed to determine the appropriate intensities for the OLEDs within the four or more color display device. This resampling process may consider relevant display attributes, such as the sampling area, sampling location, and size of each intended OLED.

This process may further include a step of determining the intended RGB display format for the input data. If this step determines that the image data has already been sampled for a display device having a particular spatial arrangement of OLEDs, a preliminary resampling can be performed that results in the three color input signals representing the same spatial location within a pixel. This preliminary step allows the subsequent three to four color transformation to determine four color values at each spatial location on the display device.

Figure 5:
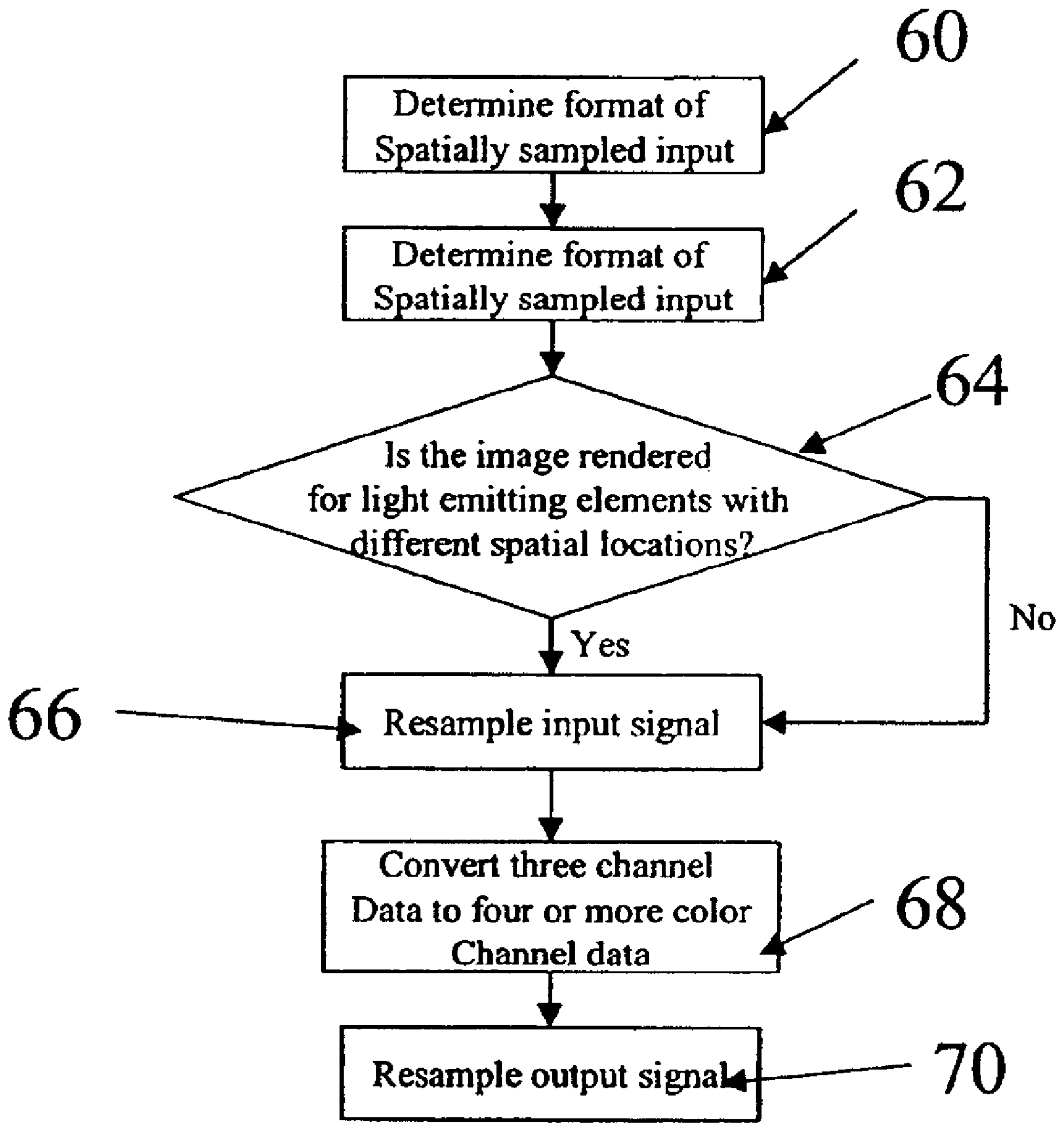
FIG. 5 is a flow diagram illustrating a method of the present invention including spatial interpolation.

A process that may be used for resampling and transformation of the three color signal is shown in FIG. 5. The process receives 60 three color input signals in linear intensities. The sample format of the spatially sampled input signal is determined 62. Once the sample format is determined, it is determined 64 if the signals for the three color input signals are rendered for OLEDs that have different spatial locations. If the data has been rendered for light emitting elements having different spatial locations, the optional step of resampling 66 the data to have three color information at each sampling location is then performed and may result in color values at each spatial position represented in the three color input signal, color values at each spatial position on the final display, or color values at other spatial locations The three color signal is then converted 68 to form four or more color signals using the method such as the one shown in FIG. 2 and discussed earlier. The four or more color output signals are then resampled 70 to the spatial pattern of the four or more color display device if this resampling was not completed in step 66. While these basic steps may be applied in any three to four or more color spatial interpolation process, the steps of determining the input signal and resampling the data may be accomplished through a number of methods that include various levels of complexity. Each of these steps will be elaborated further.

Determine Input Signal

Figure 6B:
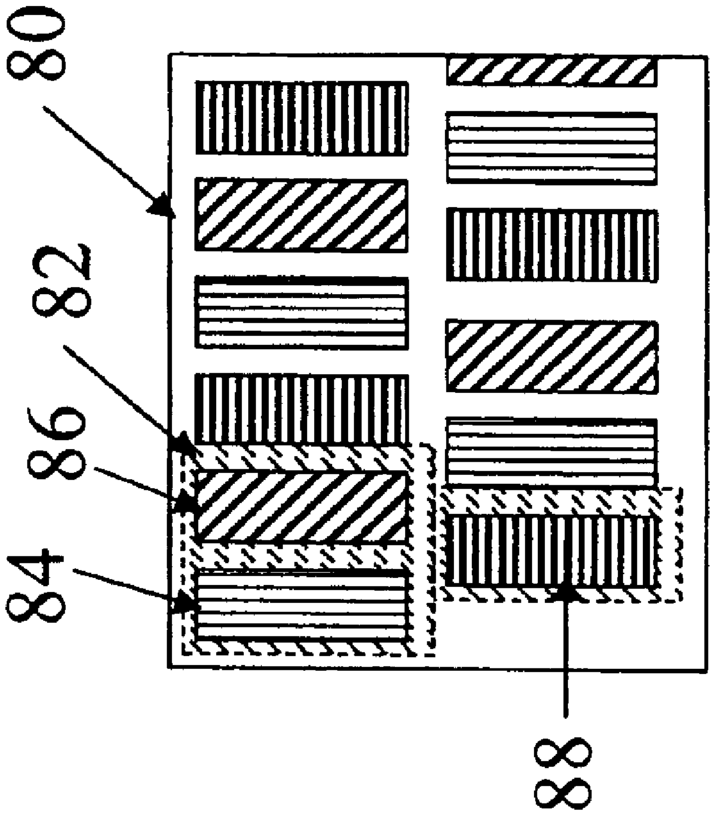
Fig. 6b (Prior Art)
FIG. 6*b* is a drawing of a typical prior art RGB delta arrangement of OLEDs.
Figure 6A:
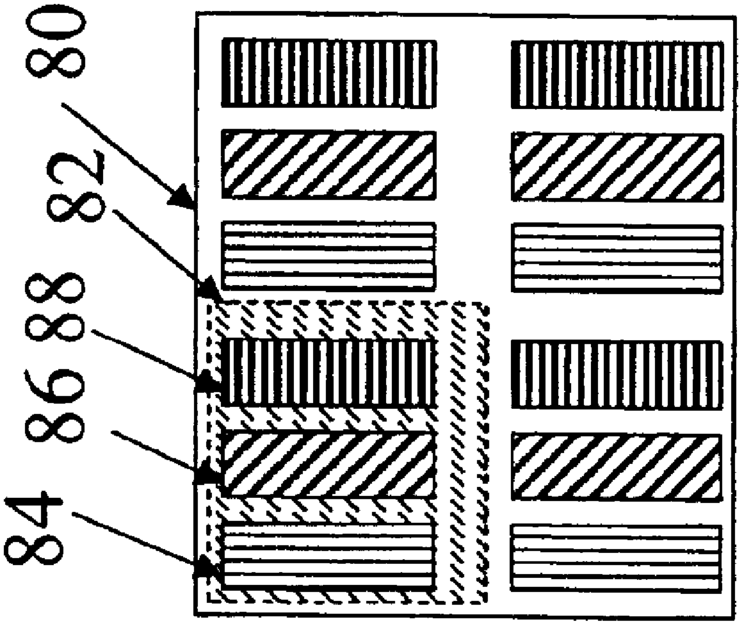
Fig. 6a (Prior Art)
FIG. 6*a* is a depiction of a typical prior art RGB stripe arrangement of OLEDs.

To properly transform the three color input signals to corresponding gamut defining color primaries and one additional primary, a spatially overlapping input signal (i.e., a signal that provides three color input signals at each spatial location) is desired. However, since spatial interpolation of a three color signal is known in the art, the input signal may have already have been sampled for a display device with a particular spatial arrangement of light emitting elements. For example, the incoming signal may have been spatially sampled for a display device as shown in FIG. 6*a* wherein the display device 80 has pixels 82 composed of a common arrangement of red 84, green 86, and blue 88 OLEDs arranged in a stripe pattern. That is, a typical rendering routine in a computer operating system, such as MS Windows 2000, may render information with the intent of having it displayed on a display device with a stripe pattern.

To determine the format of a spatially sampled input signal, a number of means may be employed, including communicating intended data formats through metadata flags or through signal analysis. To make this determination using metadata, one or more data fields may be provided with the three color input signal, indicating the intended arrangement of light emitting elements on the display device.

Figure 7:
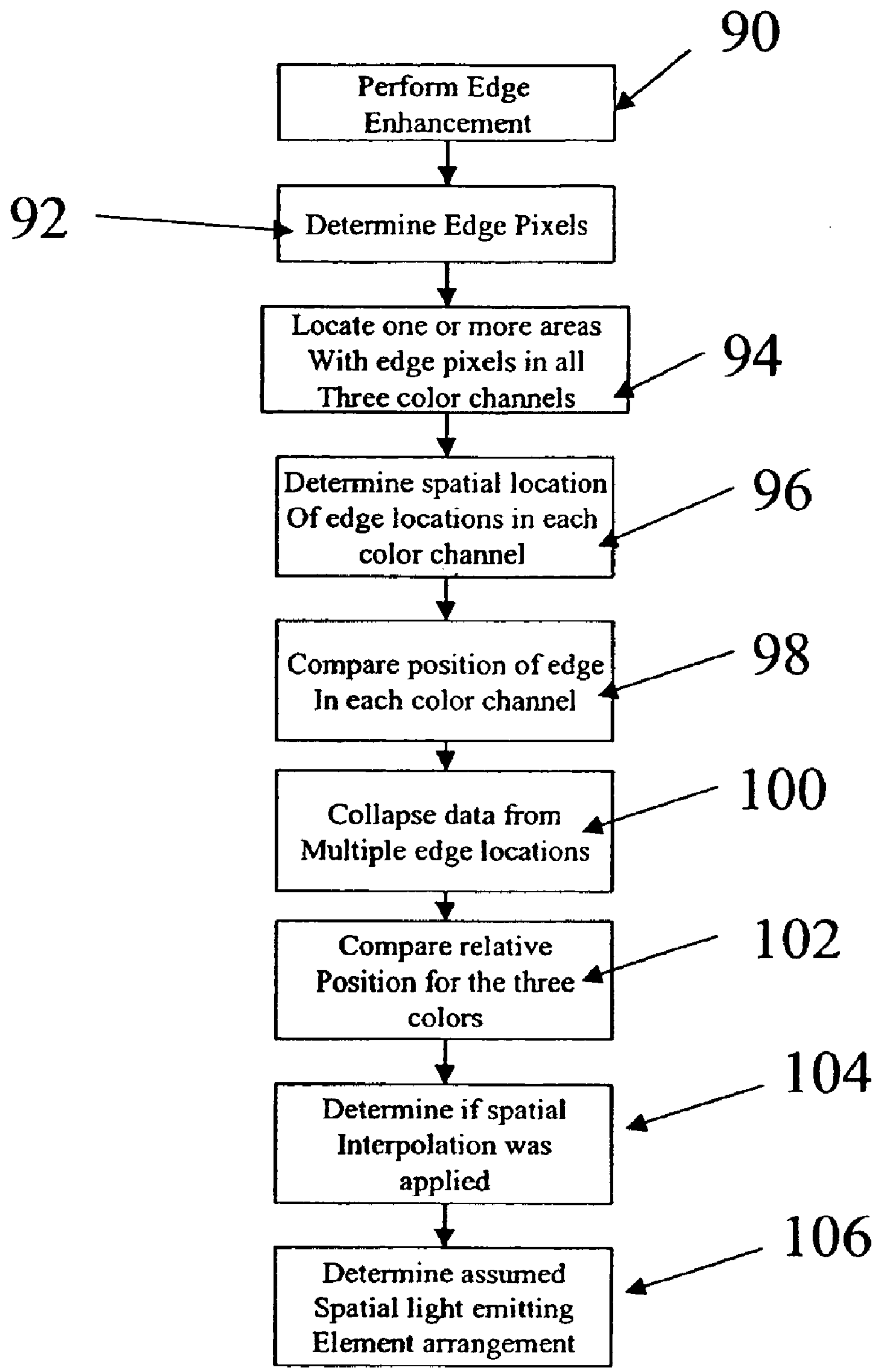
FIG. 7 is a flow diagram illustrating a method for determining the assumed OLED arrangement.

The incoming signal may also be analyzed to determine any spatial offset in the data. To perform such an analysis, it is important to determine features of the incoming signal that indicate if resampling has been applied to the three input color signals. One method of performing this analysis is shown in FIG. 7. This method allows the automatic differentiation of different three color input signals, including color input signals without resampling, color input signals resampled to be presented on a stripe pattern as shown in FIG. 6*a*, and color input signals resampled to be presented on a delta pattern as shown in FIG. 6*b*. These patterns were included in this example since as these spatial arrangements are the commonly employed arrangements within the display industry. However, it will be appreciated by one skilled in the art that this method can be extended to determine if the color input signals have been resampled to alternative patterns.

As shown in FIG. 7, edge enhancement is performed 90 on each of the three color input signals. Since OLED arrangements such as the stripe pattern shown in FIG. 6*a* consist of OLEDs that are offset from each other in the horizontal direction, a horizontal edge enhancement routine may be applied to the image signal. One such digital edge enhancement algorithm is applied by calculating a value at each horizontal position i and vertical position j using the equation:

$$E_{i,j,c}=V_{i,j,c}-V_{(i+1,j,c)} \qquad \text{Eq. 1}$$

where $E_{i,j,c}$ is the enhanced value for horizontal location i in color signal c, $V_{i,j,c}$ is the input value for location i,j in color c, and $V_{(i+1,j,c)}$ is the input value for location i+1,j in color c.

Edge pixels are then determined 92 in each of the three edge enhanced, color input signals. A common technique for determining edge pixels is to apply a threshold to the enhanced values. Locations with a value higher than the appropriate threshold are considered edge pixels. The threshold may be the same or different for each of the three edge enhanced color signals.

One or more edge locations with signal in all three color channels are then located 94. These edge locations may be found by determining a spatial location containing enhanced pixels in which values greater than the threshold all occur within a sampling window determined by the size of a pixel.

The location of an edge feature is then determined 96. An appropriate edge feature may, for example, be the spatial location of the half height of each edge. To compute the half height of an edge, a contour, such as a second order polynomial or a sigmoidal function can be fit to the original data within 3 to 5 pixels of the edge pixel location. A point on the function, i.e., half of the maximum amplitude, is then determined and the spatial location of this value is determined as the location of the edge feature. This step is completed independently for edges in each of the three color input signals.

The spatial location of the feature on the edges for the three color signals can be compared 98 and the degree of alignment of each edge feature is analyzed. However, since these positions may not be precise, the relative spatial location with respect to the spatial location of a pixel edge is determined for a number of edges within each color signal and averaged 100 for all identified edge locations within each color input signal.

The average relative location of the edge feature for each color is then compared 102 with the average relative location of the edge features for the other colors. If at least two of these edge features for the three colors are misaligned by more than the width of an OLED, there is a strong indication that a previous spatial resampling step has been performed. Through this comparison, it is determined 104 if spatial resampling has been applied. If all three edge features are misaligned, then the signal has been interpolated to a pattern of light emitting elements that have all of their energy within one dimension, such as the stripe pattern shown in FIG. 6*a*. If the edge features of two colors on one row occur at the same spatial location as the edge feature of one or more colors on a neighboring row, then the signal has been interpolated to a pattern of light emitting elements that are spread across two rows, as in the Delta pattern shown in FIG. 6*b*. Through this comparison, the assumed spatial arrangement of the light emitting elements in the display is determined 106.

Resampling

Figure 8B:
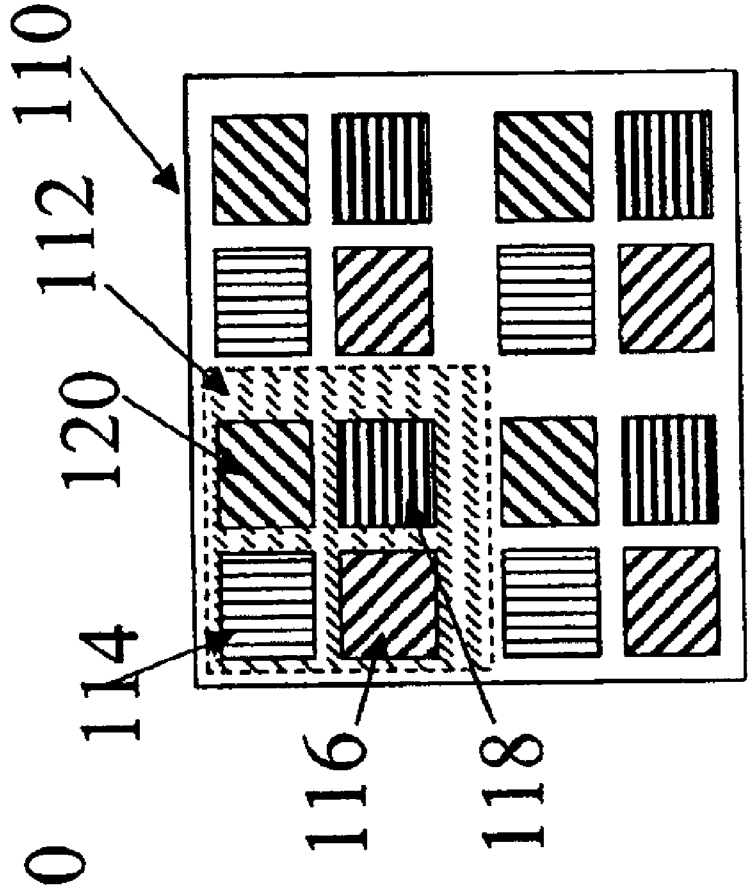
FIG. 8*b* is a depiction of a RGBW quad arrangement of OLEDs useful with the present invention.
Figure 8A:
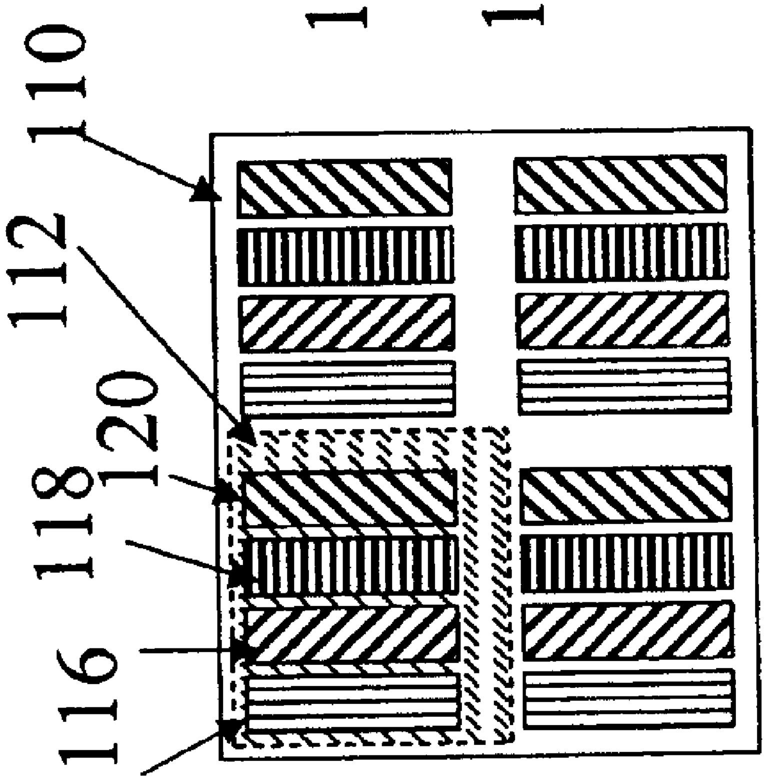
FIG. 8*a* is a depiction of a RGBW stripe arrangement of OLEDs useful with the present invention.
Figure 9:
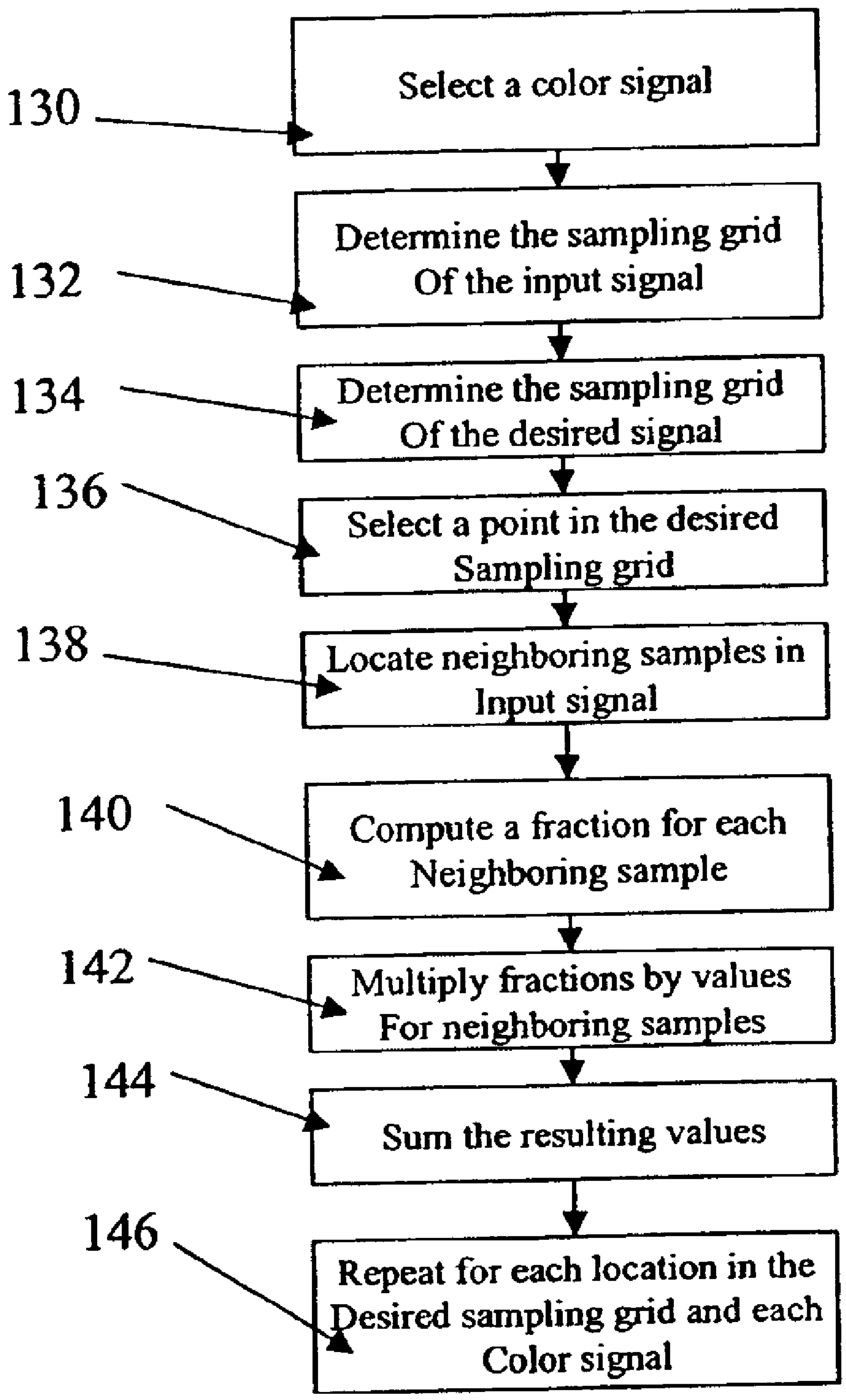
FIG. 9 is a flow diagram illustrating a method for performing spatial resampling of the color signal useful with the present invention.

Resampling may be performed either to resample data from a format intended for display on a prior art stripe or delta pattern as shown in FIG. 6*a* and FIG. 6*b* to a format with a color signal representing a value at every spatial location or it may be used to resample data from a format with a color signal at every spatial location to a pattern that includes a white subpixel, such as the stripe pattern shown in FIG. 8*a* or the quad pattern shown in FIG. 8*b*. As shown in each of these figures, the display device 110 is composed of pixels 112 having red 114, green 116, blue 118 and white 120 OLEDs.

Various resampling techniques are known in the art and have been described by others including US Patent Application No. 2003/0034992A1, referenced above, and Klompenhouwer, et al., Subpixel Image Scaling for Color Matrix Displays, SID 02 Digest, pp. 176–179. These techniques generally include the same basic steps. To perform resampling, a single color signal (e.g., red, green, blue, or white) is selected 130. The sampling grid (i.e., location of each sample) of the input signal is determined 132. The desired sampling grid 134 is then determined. A sample point corresponding to a spatial location in a pixel is selected 136 in the desired sampling grid. If a sample does not exist in the input signal at this spatial location, neighboring input signal values in the color signal (i.e., either in the three color input signal or the four color output signal depending on when in the process resampling is applied) are located 138 in either one or two dimensions. A set of weighted fractions related to the spatial locations represented by the neighboring input signal values are then computed 140. These fractions may be computed by a number of means including determining the distance from the desired sample location to the neighboring samples in the input signal within each spatial dimension and summing these distances and dividing each distance by the sum of the distance from the selected sample point to the position of the neighboring samples in each dimension. The neighboring input signal values are then multiplied 142 by their respective weighted fractions to produce weighted input signal values. The resulting values are then added 144 together, resulting in the resampled data at the selected position in the desired sampling grid. This same process is repeated 146 for each grid position in the desired sampling grid and then for each color signal.

By performing the spatial resampling and color conversion as shown in FIG. 5, the resulting signal is not only converted from a three to a four or more color signal, the resulting signal is also converted from a three color signal with one assumed spatial sampling to a more than three color signal with a desired spatial sampling.

This method may be employed in an application specific integrated circuit (asic), programmable logic device, a display driver or a software product. Each of these products may allow the form of the functions F1, F2 and F3 to be adjusted through the storage of programmable parameters. These parameters may be adjusted within a manufacturing environment or adjusted through a software product that allows access to these parameters.

It is known in art to provide methods to compensate for aging or decay of OLED materials within an OLED display device. These methods provide a means for measuring or predicting the decay of OLED materials providing an estimate of the luminance of each primary or each primary within each pixel. When this information is available, this information may be used as an input to the calculation of relative luminance of the display. Alternately, in a display device having a method to determine aging, it can be desirable to adjust F1, F2, and F3 to reduce the reliance on the color primaries that are undergoing the most decay within the display device. In a display device having red, green, blue and white color signals, adjustment of any or all of F1, F2 and F3 can be used to shift more luminance output to the red, green and blue primaries or to the white primary where lowering the luminance output of one of these groups of OLEDs slows the decay of the OLEDs used to produce a desired color.

The invention has been described in detail with particular reference to certain preferred embodiments thereof, but it will be understood that variations and modifications can be effected within the spirit and scope of the invention.

PARTS LIST

| | |
|---|---|
| 2 | red primary chromaticity |
| 4 | green primary chromaticity |
| 6 | blue primary chromaticity |
| 8 | gamut triangle |
| 10 | additional in-gamut primary chromaticity |
| 12 | additional out-of-gamut primary chromaticity |
| 22 | input signals for gamut-defining primaries |
| 24 | calculate additional primary normalized signals step |
| 26 | signals normalized to additional primary |
| 28 | calculate function F1, common signal step |
| 30 | calculate function F2 of common signal step |
| 32 | addition step |
| 34 | output signals normalized to additional primary |
| 36 | calculate white-point normalized signals step |
| 40 | calculate function F3 of common signal step |
| 42 | output signals for additional primary |
| 52 | knee of curve |
| 60 | receiving step |
| 62 | format determining step |
| 64 | spatial location determining step |
| 66 | resampling three color input signal step |
| 68 | converting to four color output signal step |

-continued

| PARTS LIST | |
|---|---|
| 70 | resampling four color output signal step |
| 80 | display device |
| 82 | pixel |
| 84 | red OLED |
| 86 | green OLED |
| 88 | blue OLED |
| 90 | perform edge enhancement step |
| 92 | determine edge pixels step |
| 94 | locate edge step |
| 96 | determine edge feature step |
| 98 | compare edge feature step |
| 100 | average relative edge feature location step |
| 102 | compare average relative edge feature location step |
| 104 | determine application of spatial resampling step |
| 106 | determine assumed spatial arrangement step |
| 110 | display device |
| 112 | pixel |
| 114 | red OLED |
| 116 | green OLED |
| 118 | blue OLED |
| 120 | white OLED |
| 130 | select color signal step |
| 132 | determine input sampling grid step |
| 134 | determine desired sampling grid step |
| 136 | select sample point step |
| 138 | locate neighboring input signal values step |
| 140 | compute weighted fractions step |
| 142 | multiply neighboring input signal values step |
| 144 | add resulting values step |
| 146 | repeat step |

What is claimed is:

1. A method for transforming three color input signals (R, G, B) corresponding to three gamut defining color primaries to four color output signals (R', G', B', W) corresponding to the gamut defining color primaries and one additional color primary W for driving a display having a white point different from W, comprising:

a) normalizing the color input signals (R,G,B) such that a combination of equal amounts in each signal produces a color having XYZ tristimulus values identical to those of the additional color primary to produce normalized color signals (Rn,Gn,Bn);

b) calculating a common signal S that is a function F1 of the three normalized color signals (Rn,Gn,Bn);

c) calculating a function F2 of the common signal S and adding it to each of the three normalized color signals (Rn,Gn,Bn) to provide three color signals (Rn',Gn', Bn');

d) normalizing the three color signals (Rn',Gn',Bn') such that a combination of equal amounts in each signal produces a color having XYZ tristimulus values identical to those of the display white point to produce three of the four color output signals (R',G',B'); and e) calculating a function F3 of the common signal S and assigning it to the fourth color output signal W.

2. The method claimed in claim 1, wherein the function F1 is the minimum of the normalized color signals (Rn,Gn, Bn).

3. The method claimed in claim 1, wherein the function F1 is the minimum of the non-negative normalized color signals (Rn,Gn,Bn).

4. The method claimed in claim 1, wherein the function F2 is a negative function.

5. The method claimed in claim 1, wherein functions F2 and F3 are linear functions.

6. The method claimed in claim 5, wherein linear functions F2 and F3 are opposites.

7. The method claimed in claim 1, wherein functions F2 and F3 vary depending on the values of the color input signals (R,G,B).

8. The method claimed in claim 7, wherein the functions F2 and F3 increase in slope with decreasing color saturation represented by color input signals (R,G,B).

9. The method claimed in claim 7, wherein the functions F2 and F3 increase in slope with increasing luminance represented by color input signals (R,G,B).

10. The method claimed in claim 7, wherein the functions F2 and F3 are nonlinear, having a smaller slope when the common signal S is high.

11. The method claimed in claim 7, wherein the functions F2 and F3 vary according to the hue represented by color input signals (R,G,B).

12. The method claimed in claim 1, wherein the color input signals (R,G,B) represent intensities of their corresponding primaries normalized such that a combination of equal amounts in each signal produces a color having XYZ tristimulus values identical to those of a desired white point.

13. The method claimed in claim 1, wherein the color input signals (R,G,B) are non-linearly related to intensities of their corresponding primaries.

14. The method claimed in claim 13, wherein the color input signals are code values.

15. The method claimed in claim 14, wherein code values have been shifted by an amount to better approximate linearity with intensity, and further comprising the step of shifting the three color output signals (R', G', B') by the negative of the amount.

16. The method claimed in claim 1, further comprising the steps of:

further transforming three of the four color output signals (R', G', B', W) to four additional color output signals (A', B', C', $W_2$), where A', B,' and C' are the three transformed color output signals and $W_2$ is a color output signal of a further additional color primary for driving the display by applying steps a–e, and repeating the further transformation for any number of additional color primaries.

17. The method claimed in claim 16, wherein the selection of which three of the four color output signals resultant in each iteration will be further processed is dependent on the function F1 in the current iteration.

18. The method claimed in claim 16, wherein the selection of which three of the four color output signals resultant in each iteration will be further processed is dependent on the power efficiency of the primary being selected.

19. The method claimed in claim 1, further including spatially resampling the four color output signals to a spatial arrangement of OLEDs in an OLED display device.

20. The method claimed in claim 19, wherein the step of spatially resampling comprises:

a) selecting a sample point corresponding to an OLED in the display device;

b) locating neighboring output signal values in the four color output signals corresponding to a color of the OLED at the selected sample point;

c) forming a set of weighted fractions related to the spatial locations represented by the neighboring output signal values;

d) multiplying the neighboring output signal values by their respective weighted fractions to produce weighted output signal values; and e) adding the weighted output signal values to obtain a resampled output value for the selected sample point.

21. The method claimed in claim 1, wherein the three color input signals represent different spatial locations within a pixel and further including resampling the three color input signals to represent the same spatial location within the pixel.

22. The method claimed in claim 21, further including:

a) selecting a sample point corresponding to a spatial location within a pixel;

b) locating neighboring input signal values in the three color input signals corresponding to a color at the selected sample point;

c) forming a set of weighted fractions related to the spatial locations represented by the neighboring input signal values;

d) multiplying the neighboring input signal values by their respective weighted fractions to produce weighted input signal values; and e) adding the weighted input signal values to obtain a resampled input signal value for the selected sample point.

23. A method for transforming three color input signals (R, G, B) corresponding to three gamut defining color primaries to four color output signals (R', G', B', W) corresponding to the gamut defining color primaries and one additional color primary W to provide an improved lifetime of an OLED display device, comprising the steps of:

a) calculating a common signal S that is a function F1 of the three color signals (R,G,B);

b) calculating a function F2 of the common signal S such that the slope of the function F2 is lower for high values of S than for low values of S and adding the function F2 to each of the three color signals (R,G,B) to provide three output color signals (R',G',B'); and c) calculating a function F3 of the common signal S such that the slope of the function F3 is lower for high values of S than for low values of S and assigning it to the fourth color output signal W.

24. The method claimed in claim 23, further including normalizing the color input signals (R,G,B) such that a combination of equal amounts in each signal produces a color having XYZ tristimulus values identical to those of the additional color primary to produce normalized color signals (Rn,Gn,Bn).

25. The method claimed in claim 23, wherein the function F1 is the minimum of the color signals (R, G, B).

26. The method claimed in claim 23, wherein the function F2 is a negative function.

27. The method claimed in claim 23, wherein functions F2 and F3 are non-linear functions.

28. The method claimed in claim 27, wherein functions F2 and F3 are opposites.

29. The method claimed in claim 23, wherein functions F2 and F3 vary depending on the values of the color input signals (R,G,B).

30. The method claimed in claim 23, wherein the functions F2 and F3 vary according to a hue represented by color input signals (R,G,B).

31. The method claimed in claim 23, wherein the color input signals (R,G,B) represent intensities of their corresponding primaries normalized such that a combination of equal intensities in each signal produces a color having XYZ tristimulus values identical to those of a desired white point.

32. The method claimed in claim 31, wherein the color input signals are code values and wherein the code values are shifted by an amount to better approximate linearity with intensity, and further comprising shifting the three color output signals (R', G', B') by the negative of the amount of shift.

33. The method claimed in claim 23, further including spatially resampling the four color output signals to a spatial arrangement of OLEDs in an OLED display device.

34. The method claimed in claim 33, wherein the step of spatially resampling comprises:

a) selecting a sample point corresponding to an OLED in the display device;

b) locating neighboring output signal values in the four color output signals corresponding to a color of the OLED at the selected sample point;

c) forming a set of weighted fractions related to the spatial locations represented by the neighboring output signal values;

d) multiplying the neighboring output signal values by their respective weighted fractions to produce weighted output signal values; and e) adding the weighted output signal values to obtain a resampled output value for the selected sample point.

35. The method claimed in claim 23, wherein the three color input signals represent different spatial locations within a pixel and further including resampling the three color input signals to represent the same spatial location within the pixel.

36. The method claimed in claim 35, further including:

a) selecting a sample point corresponding to a spatial location within a pixel;

b) locating neighboring input signal values in the three color input signals corresponding to a color at the selected sample point;

c) forming a set of weighted fractions related to the spatial locations represented by the neighboring input signal values;

d) multiplying the neighboring input signal values by their respective weighted fractions to produce weighted input signal values; and e) adding the weighted input signal values to obtain a resampled input signal value for the selected sample point.

37. A method for transforming three color input signals (R, G, B) corresponding to three gamut defining color primaries to four color output signals (R', G', B', W) corresponding to the gamut defining color primaries and one additional color primary W to provide an improved lifetime of an OLED display device, comprising the steps of:

a) calculating a common signal S that is a function F1 of the three color signals (R,G,B);

b) calculating a function F2 of the common signal S and adding it to each of the three color signals (R,G,B) to provide three color signals c) calculating a function F3 of the common signal S and assigning it to the fourth color output signal W;

d) selecting a sample point corresponding to an OLED in the display device;

e) locating neighboring output signal values in the four color output signals corresponding to a color of the OLED at the selected sample point;

f) forming a set of weighted fractions related to the spatial locations represented by the neighboring output signal values;

g) multiplying the neighboring output signal values by their respective weighted fractions to produce weighted output signal values; and h) adding the weighted output signal values to obtain a resampled output value for the selected sample point.

* * * * *

UNITED STATES PATENT AND TRADEMARK OFFICE

CERTIFICATE OF CORRECTION

PATENT NO. : 6,897,876 B2
DATED : May 24, 2005
INVENTOR(S) : Murdoch et al.

It is certified that error appears in the above-identified patent and that said Letters Patent is hereby corrected as shown below:

Column 6,
Lines 8-9, delete "(96.5, 1000.0, 86.8)" and insert -- (96.5, 100.0, 86.8) --.

Column 7,
Lines 8-9, delete "(Rn, Cn, Bn)" and insert -- (Rn, Gn, Bn) --.

Column 18,
Line 49, after "provide three color signals" insert -- (R', G', B'); --.

Signed and Sealed this

Sixth Day of December, 2005

JON W. DUDAS
*Director of the United States Patent and Trademark Office*